UNITED STATES PATENT OFFICE.

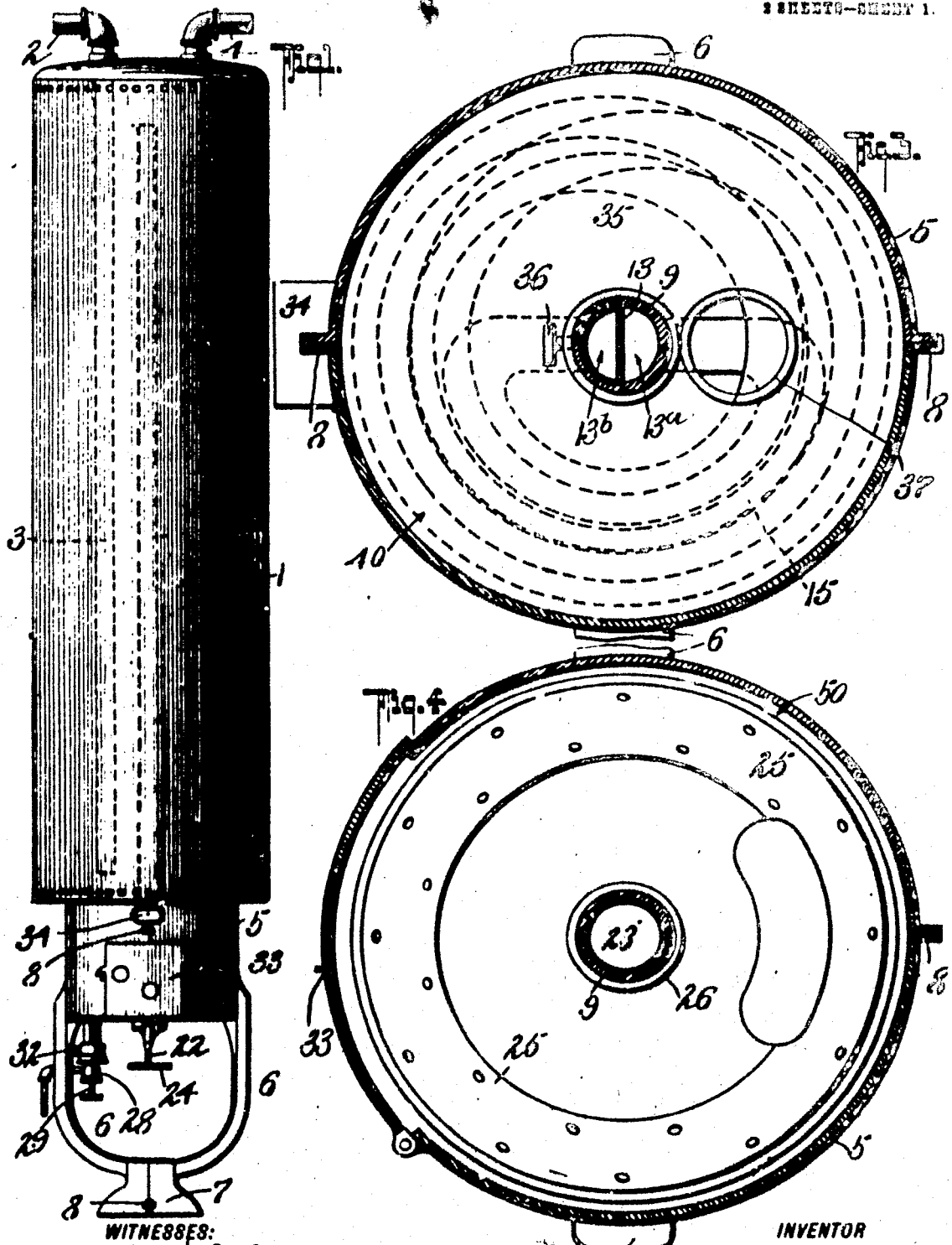

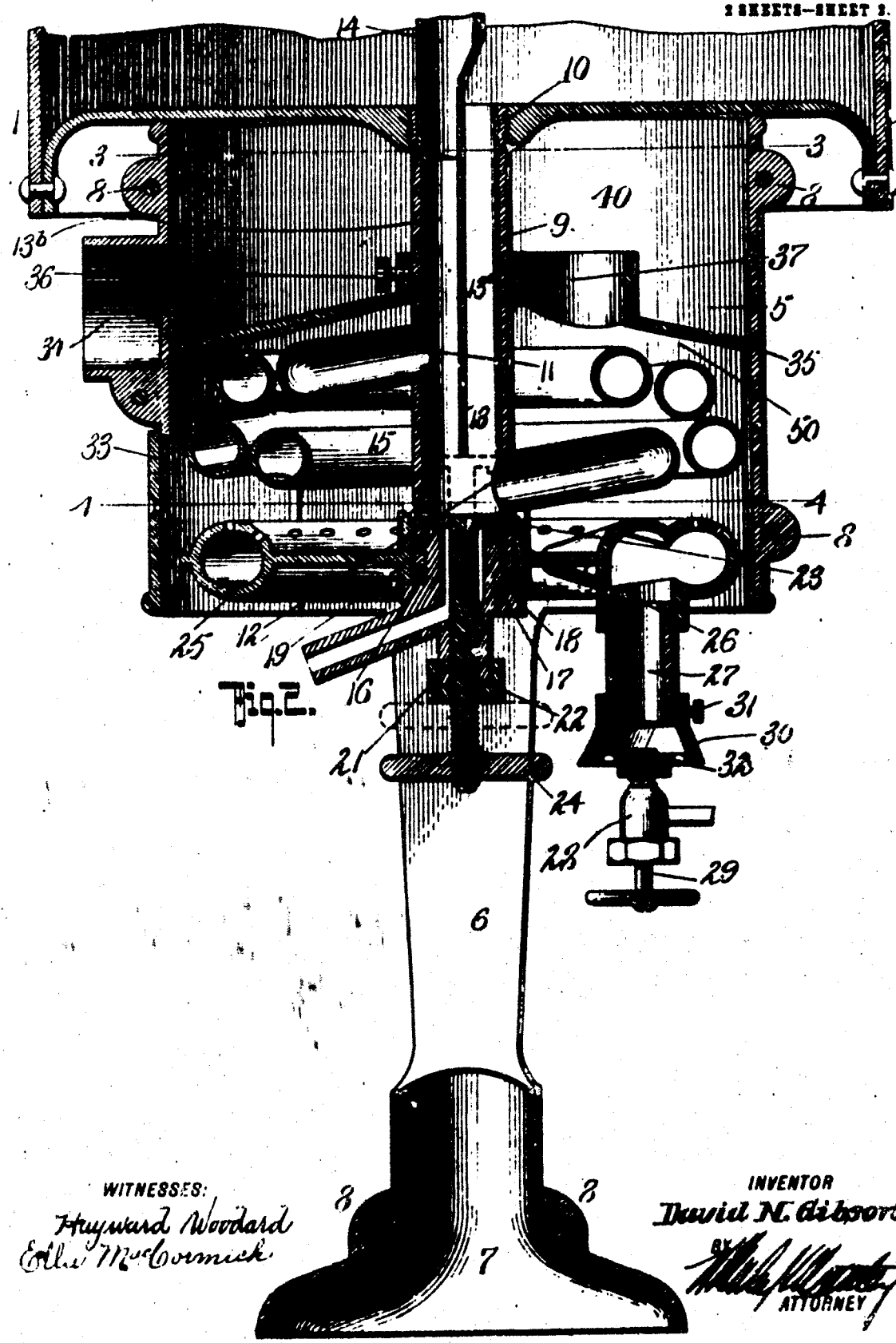

DAVID NELSON GIBSON, OF PITTSBURG, PENNSYLVANIA.

WATER-HEATING APPARATUS.

949,298.  Specification of Letters Patent.  Patented Feb. 15, 1910.

Application filed June 2, 1909. Serial No. 499,788.

*To all whom it may concern:*

Be it known that I, DAVID NELSON GIBSON, residing at Pittsburg, in the county of Allegheny and State of Pennsylvania, have invented certain new and useful Improvements in Water-Heating Apparatus, of which the following is a specification.

My invention is an improved water heater, designed for heating water contained in tanks, and it primarily has for its object to provide an efficient heater which will operate on gaseous fuel and the like, of such construction to permit ready access to the heating coil for purposes of cleaning the same.

My invention also has for its object to provide a complete apparatus for heating water for domestic use, embodying a tank supporter, water heater, circulating pipes, drain and sediment cock combined, and its main objects are to provide a simple, substantial, efficient and compact apparatus which can be readily attached to the standard type of reservoir or tank without the use of numerous pipe joints and fittings, and having all of these parts readily accessible for repairing or cleaning thus making a great saving in time of setting up or in repairing.

My invention also includes an improved outlet valve or cock, whereby the heating tube may be thoroughly flushed and cleansed and the sediment therefrom and from the tank may be quickly and effectively removed.

Those other details of construction which are novel and hereinafter described and pointed out in the appended claims, also form a part of my invention.

In the drawings: Figure 1, is a front elevation of a tank with my invention applied. Fig. 2, is an enlarged section of my invention. Fig. 3, is a horizontal section on the line 3—3 of Fig. 2. Fig. 4, is a horizontal section on the line 4—4 of Fig. 2.

Referring now to the accompanying drawings in which like letters and numerals of reference indicate like parts in all of the figures 1 designates a tank having a cold water inlet 2, that connects with the internal pipe 3 which terminates adjacent to the bottom of the tank and 4 represents the outlet pipe that takes off the hot water from the upper part of the tank. The tank 1 is supported on a cylinder 5, cast in halves secured together at 8, each half including a leg 6 and a base portion 7. A space is left between the halves of the cylinder or casing 5, which is closable by a door 33.

9 is a pipe threaded into the tank bottom as at 10. The pipe 9 is divided by a partition 13 to form two distinct passage-ways 13ᵃ—13ᵇ through the pipe 9, one of which, 13ᵃ, opens directly into the tank, 1, and the other, 13ᵇ, receives the lower end of a pipe 14 that extends up into the tank and terminates near the top thereof. The heating coil 15 has one end brazed to the pipe 9 at 11, and the other end brazed to the pipe 9 lower down below the partition 13, as at 12, one end communicating with the passage 13ᵇ and the other end with the passage 13ᵃ of the pipe 9.

In practice, the partition 13 is preferably made by flattening and extending a part of the pipe 14, although the partition 13 may be made in any other approved manner. An outlet or drain cock 17 is tapped into the lower end of the pipe 9, as at 16 and the cock 17 has a shoulder 18 for a purpose hereinafter made apparent. The cock 17 has a valve seat 19 in its upper face to receive the valve 23 whose stem 22 passes through the threaded gland 21 and carries a handle 24, as shown.

25 is a gas burner of the Bunsen type whose hub 26 encircles the pipe 9 and rests on the shoulder 18 of the cock 17.

27 represents the gas mixing pipe which unites the mixer 30 to the burner 25, the mixer 30 being secured by a set screw 31.

32 are the air ports and 28 is the gas valve casing inclosing the usual gas valve having a stem 29 as shown.

The cylinder or heating coil casing 5 has a flue 34 which may be piped-up with a chimney in the usual manner. Within the casing 5 is a hood 35 that is adjustably supported on the pipe 9 over the coil 15 by a set screw 36 and which has a flue 37 to permit passage of burned gases to the flue 34. It will be noticed that the flue 34 is below the tank bottom and the hood 35 separates the casing 5 into an upper chamber 40 and a lower chamber 50 which houses the coil 15 and burner 25, etc.

Operation: In operation the gas issues from the burner 25 when the valve 23 is opened and is ignited at the burner 25, thus heating the coil 15 and setting up the circulation of water through the coil from the end 12 to end 11. The hot water, passing up the passage 13ᵇ of the pipe 9, passes into the pipe 14, through which it passes to the top of the tank, while the cooler water passes down the other passage 13ᵃ of the pipe 9 to the inlet end 12 of the coil 15. When it is desired to blow out the sediment from within the coil 15 the valve 23 is raised to the position shown in dotted lines in Fig. 2, to cut off communication between the lower end of the two passageways 13ᵃ—13ᵇ of the pipe 9 to compel the water from the tank all to flow through the coil 15. When the valve 23 is half-way open the sediment from the tank 1 will be blown out.

I desire to call particular attention to the fact that the burner 25, the coil 15 and the hood 35 are made to conform to the cylindrical shape of the casing and thus form a guide for the same. I also desire to call attention to the fact that in "blowing out" the pipe, the water has to come through the circulating pipe 9 as well as the coil 15.

Numerous advantages of my improved water heating apparatus will be readily apparent to those skilled in the art to which this invention appertains.

From the foregoing description taken in connection with the accompanying drawings it is thought the complete construction, operation and many advantages of my invention will be readily understood by those skilled in the art to which the invention appertains.

What I claim is:

1. A water heater comprising a casing, a tank supported over the casing, a pipe within the casing in communication with the tank, a heating coil connected with said pipe, means dividing the pipe into a plurality of passages, an outlet cock for said pipe, said outlet cock including a valve for closing the passage through the cock when in one position, and for cutting off communication between the passages of the pipe when in another position, and a burner supported by said pipe to heat said coil.

2. A water heater comprising a casing, a tank supported over the casing, a pipe within the casing in communication with the tank, a heating coil connected with said pipe, means dividing the pipe into a plurality of passages, an outlet cock for said pipe, said outlet cock including a valve for closing the passage through the cock when in one position and for cutting off communication between the passages of the pipe when in another position, a burner supported by said pipe to heat said coil, and a hood over said burner, said hood having a flue and said casing having a flue.

3. A water heater comprising a supporting casing, a tank supported thereover, a pipe connected with the bottom of said tank, and communicating therewith, means dividing said pipe into two longitudinal passages in communication with one another at the bottom, a heating coil having one end connected with said pipe below said dividing means and having its other end connected with said pipe above the bottom of said dividing means, one of said pipe passages being in communication with one end of the heating coil, a burner support on said pipe to heat said coil, said casing having a door to provide access to said burner and coil, and having a flue disposed beneath the bottom of said tank to provide an outlet for burned gases and form a heat retaining chamber beneath the tank bottom.

4. A water heater comprising a casing or support, a pipe mounted within said casing and having a partition to form a plurality of longitudinal passages through a portion of its length, a heating coil having one end connected to said pipe above the bottom of said partition to communicate with one of said longitudinal passages, said coil having its other end connected with said pipe below said partition, a member connected with said pipe beneath said partition and having an outlet passage, a valve when in one position closing said outlet passage, and when in another position opening said outlet passage and closing communication between the longitudinal passages of said pipe, and a burner beneath said coil for heating the same, and means for admitting water into one passage of the pipe to flow through the heating coil and out through the other passage of the pipe.

5. A water heater comprising a casing or support, a pipe mounted within said casing and having a partition to form a plurality of longitudinal passages throughout a portion of its length, a heating coil having one end connected to said pipe above the bottom of said partition to communicate with one of said longitudinal passages, said coil having its other end connected with said pipe below said partition, a member connected with said pipe beneath said partition and having an outlet passage, a valve when in one position closing said outlet passage, and when in another position opening said outlet passage and closing communication between the longitudinal passages of said pipe, a burner beneath said coil for heating the same, means for admitting water into one passage of the pipe to flow through the heating coil and out through the other passage of the pipe, a hood supported over said heating coil on said pipe and having a flue to permit passage of the burned gases.

6. A water heater comprising a casing or support, a pipe mounted within said casing and having a partition to form a plurality of longitudinal passages throughout a portion of its length, a heating coil having one end connected to said pipe above the bottom of said partition to communicate with one of said longitudinal passages, said coil having its other end connected with said pipe below said partition, a member connected with said pipe beneath said partition and having an outlet passage, a valve when in one position closing said outlet passage and when in another position opening said outlet passage, and closing communication between the longitudinal passages of said pipe, a burner beneath said coil for heating the same, means for admitting water into one passage of the pipe to flow through the heating coil and out through the other passage of the pipe, a hood supported over said heating coil on said pipe and having a flue to permit passage of the burned gases, said casing inclosing a heating chamber above said hood and said casing having an outlet flue near the bottom of said heating chamber.

7. A water heater comprising a casing, a tank supported thereover to form a closure for the upper end of the casing, a pipe threaded into the bottom of said tank and projected downwardly into the casing, a partition within said pipe dividing it into a plurality of longitudinal passages extending through a portion of its length, a heating coil having one end connected to said pipe at a place above the bottom of said partition and having its other end connected to said pipe at a place below the bottom of said partition, an off-take cock in communication with one end of said pipe in a position below said heating coil, said cock when opened adapted to close off communication between the longitudinal passages of said pipe and a burner supported on said pipe and cock beneath said heating coil.

8. A water heater comprising a casing, a tank supported thereover to form a closure for the upper end of the casing, a pipe threaded into the bottom of said tank and projected downwardly into the casing, a partition within said pipe dividing it into a plurality of longitudinal passages extending through a portion of the length, a heating coil having one end connected to said pipe at a place above the bottom of said partition and having its other end connected to said pipe at a place below the bottom of said partition, an off-take cock in communication with one end of said pipe in a position below said heating coil, said cock when opened adapted to close off communication between the longitudinal passages of said pipe, a burner supported on said pipe and cock beneath said heating coil, one passage of said pipe communicating with said tank at the bottom and a pipe communicating at one end with the other passage of said first mentioned pipe and having its other end opening near the top of the tank.

DAVID NELSON GIBSON.

Witnesses:
W. C. BLETCHER,
F. J. TYRRELL.